US012447489B2

(12) United States Patent
Brahim et al.

(10) Patent No.: US 12,447,489 B2
(45) Date of Patent: Oct. 21, 2025

(54) REFILLABLE FLUID PRODUCT DISPENSER

(71) Applicant: APTAR FRANCE SAS, Le Neubourg (FR)

(72) Inventors: Xavier Brahim, Ferrieres Haut Clocher (FR); Antoine Ailliot, St Sebastien de Morsent (FR)

(73) Assignee: APTAR FRANCE SAS, Le Neubourg (FR)

( * ) Notice: Subject to any disclaimer, the term of this patent is extended or adjusted under 35 U.S.C. 154(b) by 170 days.

(21) Appl. No.: 18/014,061

(22) PCT Filed: Jul. 2, 2021

(86) PCT No.: PCT/FR2021/051218

§ 371 (c)(1),
(2) Date: Dec. 30, 2022

(87) PCT Pub. No.: WO2022/003303

PCT Pub. Date: Jan. 6, 2022

(65) Prior Publication Data

US 2023/0264216 A1 Aug. 24, 2023

(30) Foreign Application Priority Data

Jul. 3, 2020 (FR) ....................................... 2007098

(51) Int. Cl.
*B05B 11/00* (2023.01)
*B05B 11/10* (2023.01)

(52) U.S. Cl.
CPC ...... *B05B 11/0056* (2013.01); *B05B 11/0039* (2018.08); *B05B 11/1023* (2023.01)

(58) Field of Classification Search
CPC ............. B05B 11/0056; B05B 11/0039; B05B 11/1023; B05B 11/0044; B05B 11/1025; B65D 83/42
See application file for complete search history.

(56) References Cited

U.S. PATENT DOCUMENTS 3,559,701 A * 2/1971 Wittersheim .......... B65D 83/42 141/303
4,473,097 A * 9/1984 Knickerbocker .. B65D 81/3211 222/215

(Continued)

FOREIGN PATENT DOCUMENTS

CN 202244716 U 5/2012
CN 202346156 U 7/2012

(Continued)

OTHER PUBLICATIONS

International Search Report of PCT/FR2021/051218 dated Oct. 8, 2021 [PCT/ISA/210].

(Continued)

*Primary Examiner* — Charles P. Cheyney
(74) *Attorney, Agent, or Firm* — Sughrue Mion, PLLC

(57) ABSTRACT

A refillable fluid product dispenser having a fluid product reservoir defining a neck and a filling port; a dispensing member, such as a pump, mounted on the neck of the fluid product reservoir for extracting the fluid product; a filling valve; a chamber separating the filling port from the filling valve. The chamber has a retention mechanism for retaining the fluid product inside the chamber.

12 Claims, 3 Drawing Sheets

(56) References Cited

Figure 1:
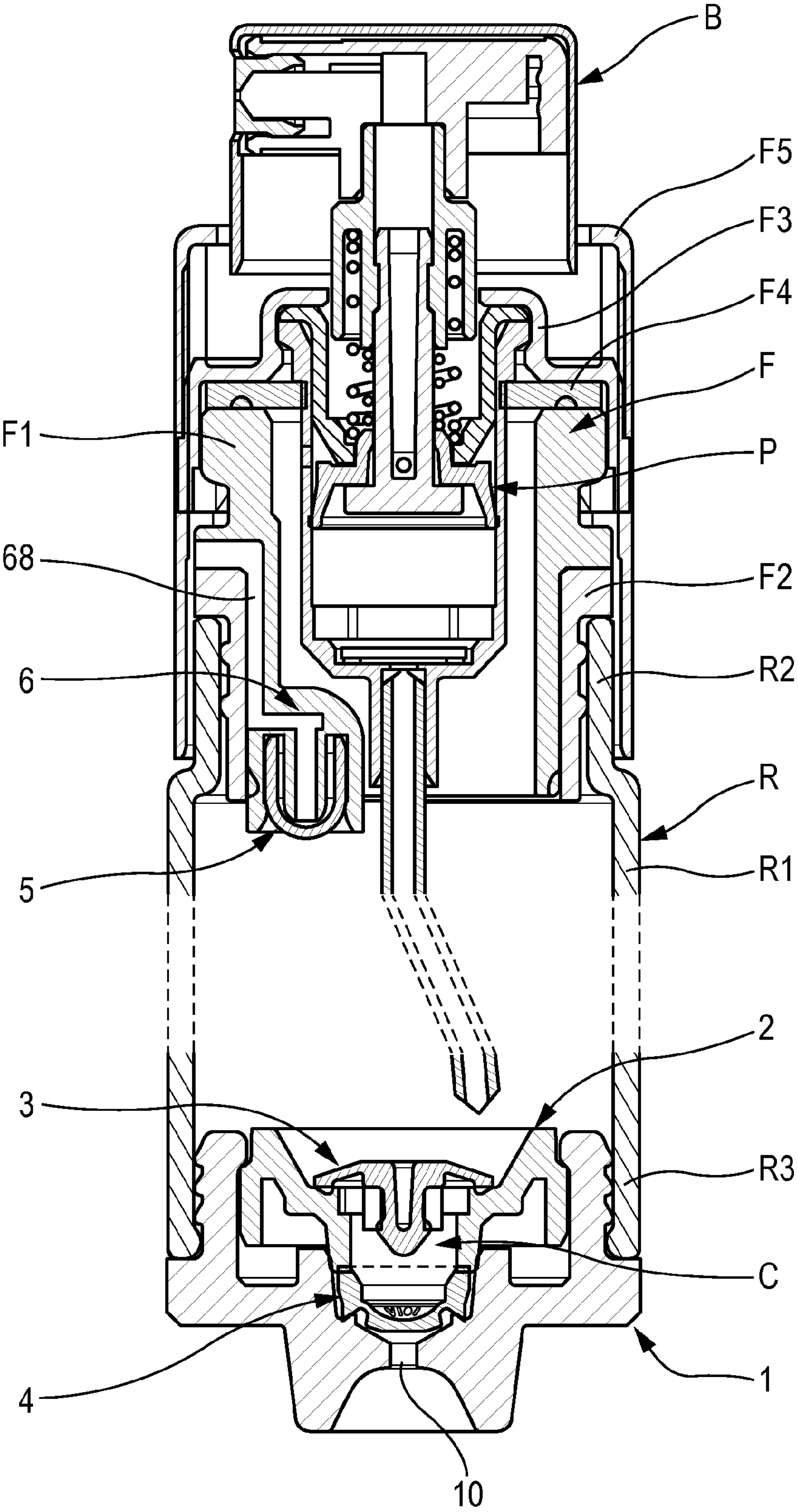

U.S. PATENT DOCUMENTS 4,930,664 A * 6/1990 Ellison .................. B05B 9/0805 222/401
4,988,017 A * 1/1991 Schrader .............. B65D 83/682 141/20
5,623,974 A * 4/1997 Losenno ............... F16K 15/145 137/511
6,354,469 B1 * 3/2002 Pozzi ................ B05B 11/00444 222/189.09
6,883,564 B2 * 4/2005 Risch .................... B65B 31/003 141/20
8,215,344 B2 * 7/2012 Windmiller .............. B65D 1/06 141/113
9,314,807 B2 * 4/2016 Croibier .............. B05B 11/0038
9,366,561 B2 * 6/2016 Muller .................... B05B 15/37
9,522,403 B2 * 12/2016 Hui ...................... B05B 11/0097
10,875,703 B2 * 12/2020 Fei ....................... B65D 83/425
2011/0309113 A1 * 12/2011 Hui ................... B05B 11/00442 222/402.16
2012/0090730 A1 * 4/2012 Dumont .............. B05B 11/0044 141/2
2014/0060695 A1 * 3/2014 Dumont .............. B05B 11/0032 141/18
2014/0190583 A1 * 7/2014 Pu ............................ B67C 3/28 137/798
2014/0197208 A1 * 7/2014 Bertin ................. B05B 11/1001 222/321.7
2016/0067727 A1 * 3/2016 Michaux ............. B05B 11/0038 222/323
2016/0279654 A1 * 9/2016 Tu ....................... B05B 11/0056
2017/0043365 A1 * 2/2017 Hui ....................... B05B 11/029

FOREIGN PATENT DOCUMENTS

FR 3 004 624 A1 10/2014
KR 10-1930255 B1 3/2019

OTHER PUBLICATIONS

International Preliminary Report on Patentability issued Oct. 11, 2022 in Application No. PCT/FR2021/051218.

* cited by examiner

REFILLABLE FLUID PRODUCT DISPENSER

CROSS REFERENCE TO RELATED APPLICATIONS

This application is a National Stage of International Application No. PCT/FR2021/051218 filed on Jul. 2, 2021, claiming priority based on French Patent Application No. 2007098 filed on Jul. 3, 2020.

The present invention relates to a refillable fluid product dispenser comprising a fluid product reservoir defining a neck and a filling port. The dispenser further comprises a dispensing member, such as a pump, mounted on the neck of the fluid product reservoir for extracting the fluid product, and a filling valve. The dispenser defines a chamber separating the filling port from the filling valve.

The preferred application field of the present invention is the perfume industry, without forgetting cosmetics as well as pharmaceuticals industries.

According to the prior art, many refillable dispensers often referred to as “nomadic dispenser” are already known. They comprise a reduced volume reservoir, in the order of 5 to 20 ml, and are refillable with a fluid product source capable of injecting fluid product under pressure through the filling port, so that the pressure of the fluid product opens the filling valve in such a way that the injected fluid product can fill the reservoir. The source generally comprises a valve stem applied against the outer edge of the filling port. For each push of the valve stem against the filling port, a dose of fluid product is injected.

At the end of the filling operation, the valve stem is removed from the filling port, but a small amount of fluid product remains present at the filling port. Sometimes, a small drop can separate. This residual fluid product can then stain an object in contact with the filling port or on which the small drop will fall.

There is therefore a cleanliness problem at the filling port with these nomadic dispensers. This is also one of the major reasons why they are not more common in trade. The user does not want to spread his perfume in all his belongings, especially those of his handbag, since nomadic dispensers are often carried in handbags.

The present invention aims to remedy this persistent cleanliness problem of nomadic dispensers of the prior art. The filling port must remain clean and therefore free of fluid product after each filling operation.

To achieve this objective, the present invention provides that the chamber, located between the filling port and the filling valve, comprises retention means for retaining the fluid product inside the chamber. Thus, there is almost no or no fluid product at the filling port, which therefore remains clean.

Advantageously, the filling valve is a hydraulic valve that opens under the action of the fluid product injected under pressure through the filling port and the chamber. The fluid product under pressure thus enters the chamber through the filling port and lifts the filling valve to reach the reservoir.

According to an implementation, the filling valve can comprise an insert forming a valve seat and a movable member selectively and sealingly engaging the valve seat. Moreover, the reservoir can comprise a bottom forming the filling port, the insert being mounted on the bottom forming therebetween the chamber. It can be therefore said that the chamber is a buffer space between the filling port and the filling valve. Advantageously, the bottom forms an inlet duct defining the filling port and an inlet to the chamber.

According to a first embodiment, the retention means can comprise an anti-drip device near the filling port. Advantageously, the anti-drip device can comprise a slotted flexible membrane that opens under the action of the fluid product injected under pressure through the filling port and that remains closed and sealed in the non-operating state. It can be provided that the slotted flexible membrane rests in the non-operating state directly against the inlet. The anti-drip device can be held in place by trapping between the bottom and the fixed insert. According to a variant, the holding in position of the anti-drip device can also be ensured by an intermediate piece.

According to a second embodiment, the chamber can have a variable volume between a maximum volume in the non-operating state and a minimum volume when a pressure is applied at the filling port, creating thus a suction effect of the fluid product towards the inside of the chamber, when this latter returns to its non-operating state. The volume change of the chamber may be due to a deformation of the bottom and/or a displacement between the bottom and the insert. Avantageously, the inlet duct defines a volume that is less than the volume change of the chamber, so as to ensure the emptying of the inlet duct. Alternatively, it is preferable that the inlet duct is long and thin to increase capillarity.

According to a third embodiment, the chamber contains a spongy material that is expressed under the action of the fluid product injected under pressure into the chamber and that is impregnated with fluid product as soon as the pressure subsides in the chamber. For example, the spongy material can fill the chamber, except for a central passage that directly connects the filling port to the filling valve. For each injection of fluid product under pressure into the chamber, the spongy material is crushed and drains its fluid product content and as soon as the pressure returns to a normal pressure, the spongy material relaxes and is impregnated with the fluid product which remains in the chamber.

According to the three embodiments, the fluid product is retained in the chamber, in such a way as to prevent the backfeeding of fluid product to the filling port. The present invention applies to fluids of all viscosities, from perfume to cosmetics. It also allows to delay or prevent the drying of cosmetics.

The present invention will now be described in greater detail in reference to the accompanying drawings giving, as non-exhaustive examples, several embodiments of the present invention.

Figure 2:
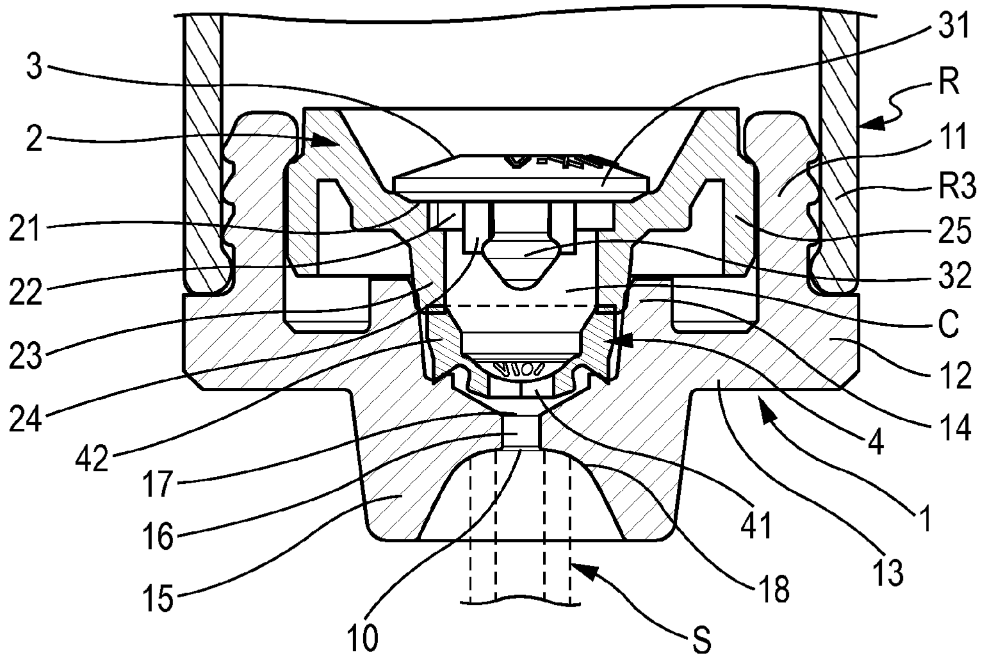
Figure 3:
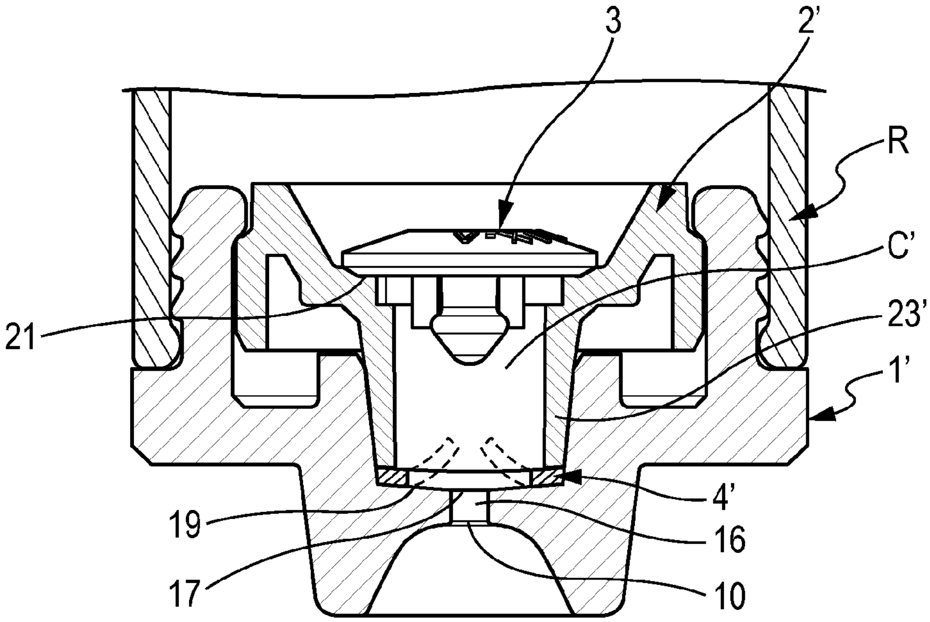
Figure 4:
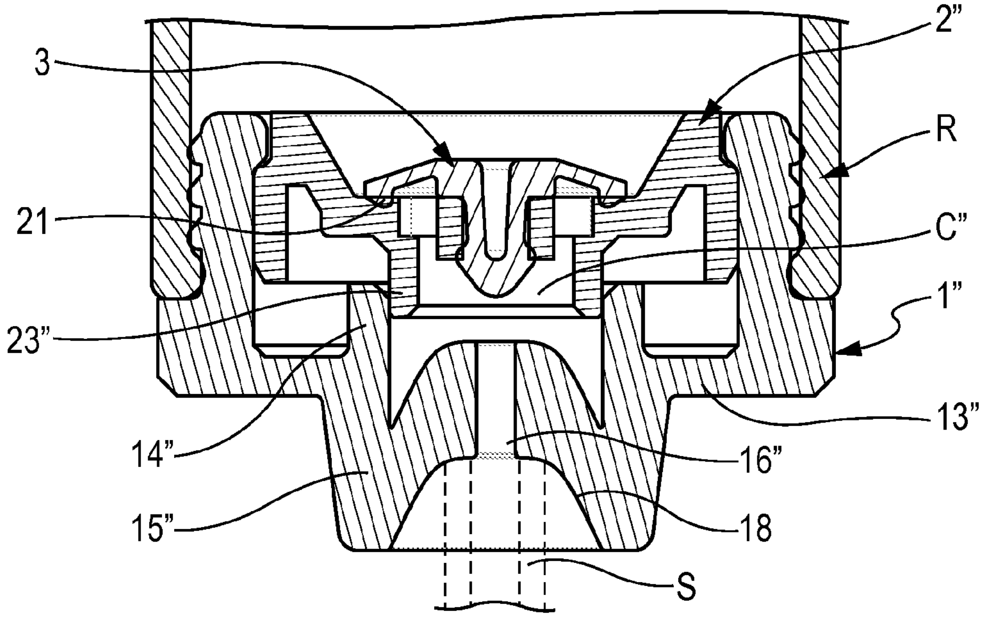
Figure 5:
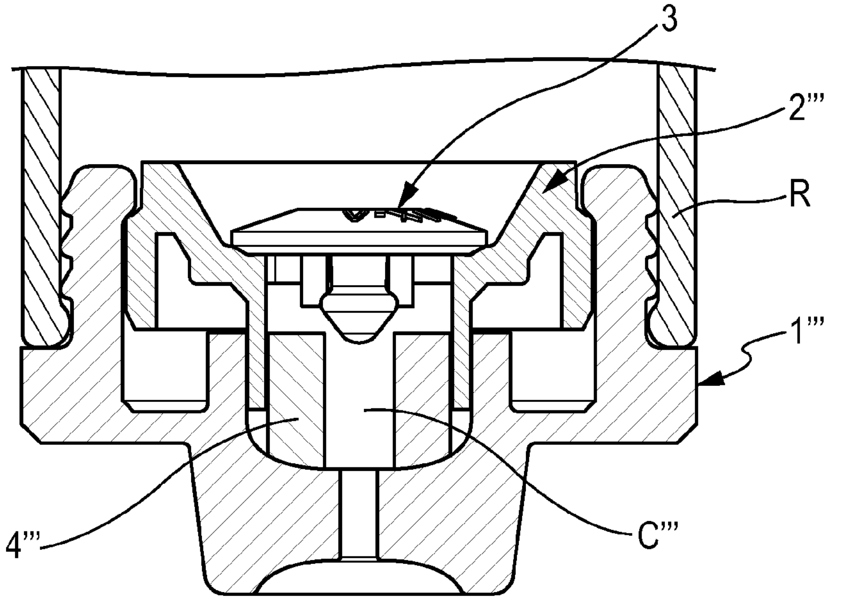

Among the figures:

FIG. 1 is a vertical cross-section view through a dispenser according to a first embodiment of the present invention, FIG. 2 is an enlarged view of the lower part of FIG. 1, FIG. 3 is a view similar to that of FIG. 2 for a implementation variant of FIG. 2, FIG. 4 is a view similar to that of FIG. 2 for a second embodiment of the present invention, and FIG. 5 is a view similar to that of FIG. 2 for a third embodiment of the present invention.

The dispenser comprises the following constitutive elements, namely a fluid product reservoir R, a dispensing member P, a fixing ring F, a pusher B, a filling valve (comprising fixed insert 2 and moveable member 3) and a vent valve 5, 6.

The fluid product reservoir R comprises a barrel R1 of a generally cylindrical shape. At its upper end, the barrel R1 defines a neck R2. The barrel R1 can be made of clear glass. At its lower end R3, the barrel R1 is provided with a reservoir bottom 1 defining a filling port 10. This bottom 1 serves as a support for the filling valve, which comprises a fixed insert 2 and a movable member 3. A chamber C is jointly defined by the bottom 1 and the fixed insert 2 between the filling port 10 and the movable member 3.

More precisely, the bottom 1 is an add-on piece in the lower end R3 of the barrel R1. The bottom 1 can be made of plastic. It comprises a sleeve 11 sealingly force-fitted in the lower end R3 of the barrel. An annular shoulder 12 rests on the free annular edge of the lower end R3. The bottom 1 forms an annular flange 13 that connects the sleeve 11 and the annular shoulder 12 to a crown 14 and a pin 15. The crown 14 protrudes towards the inside of the reservoir R, while the pin 15 protrudes in an opposed manner towards the outside. The pin 15 forms an inlet duct 16 defining the filling port 10 on the outer side and an inlet 17 on the inner side. The filling port 10 is located at the bottom of a cup 18, adapted to receive the free end of the valve stem S (shown in dotted lines) of a source of fluid product. The inner passage of the valve stem S is therefore automatically aligned with the filling port 10.

The fixed insert 2 of the filling valve is mounted, for example by snap-fitting on the bottom 1. It comprises an outer skirt 25 engaged in the sleeve 11 of the bottom 1 and a bushing 23 engaged with the crown 14 of the bottom 1. One of these two engagements, or both, can be sealed. The insert 2 also forms a central housing 24 surrounded by one or more openings 22, which are in turn surrounded by an annular valve seat 21.

The movable member 3 of the filling valve is mounted on the fixed insert 2. It comprises a flexible corolla 31 that selectively comes in a sealed abutment on the valve seat 21 of the insert 2. The movable member 3 also comprises an anchoring heel 32 that is engaged in the central housing 24. In a non-operating state, the filling valve is naturally closed. When fluid product under pressure passes through the openings 22, it lifts the corolla 31 while elastically deforming it. As soon as the pressure subsides below a predetermined threshold, the corolla 31 returns to sealing contact on its seat 21.

The bottom 1 and the fixed insert 2 form therebetween a chamber C through which the fluid product progresses by entering the inlet duct 16 and by exiting the passage created between the corolla 31 and its seat 21. This chamber C is therefore constantly being filled with fluid product. A leakage is thus possible through the inlet duct 16 and the filling port 10.

According to the present invention, the chamber C comprises retention means for retaining the fluid product inside the chamber. Thus, there is almost no or no fluid product at the filling port, which therefore remains clean. These retention means may present different implementation forms. They can function by filling, suction or impregnation.

According to a first embodiment illustrated in FIGS. 1 and 2, the retention means comprise an anti-drip device 4 located near the filling port 10. The anti-drip device 4 comprises a slotted flexible membrane 41 that opens under the action of the fluid product injected under pressure through the filling port 10 and that remains closed and sealed in the non-operating state. The anti-drip device 4 comprises a fixing ring 42 that can be held in place by trapping between the pin 15 of the bottom 1 and the bushing 23 of the fixed insert 2. The trapping of the ring 42 allows to seal the chamber C between the bottom 1 and the insert 2. This anti-drip device 4 thus functions like a shutter or a valve, but with a very low opening threshold, which generates very little load loss. Actually, the fluid product injected under pressure through the inlet duct 16 should not be hindered by the slotted flexible membrane 41, which must open easily and quickly. Its function is not to withstand pressures or depressions, but to simply hold the fluid product in the chamber C which is at atmospheric pressure, once the fluid product injection is complete. It can be considered that the anti-drip device 4 has the physical function of creating a sufficient load loss in the non-operating state to prevent the fluid product from leaking through the inlet duct 16. A perfect sealing is not required.

According to the variant illustrated in FIG. 3, the anti-drip device 4' is in the form of a simple slotted flexible disk that is held in place on its periphery by an extended bushing 23' of the insert 2', which presses the slotted flexible disk on a flat bottom wall 19 of the chamber C'. It is to be noted that the slotted flexible disk 4' rests in the non-operating state directly against the inlet 17 of the inlet duct 16. Therefore, only the content of the inlet duct 16 is likely to leak, but as its volume is extremely low, the leakage will be imperceptible.

According to a second embodiment illustrated in FIG. 4, the chamber C" has a variable volume between a maximum volume in the non-opertaing state and a minimum volume when a pressure is applied on the pin 15" at the filling port 10, whereby creating a suction effect of the fluid product towards the inside of the chamber C", when this latter returns to its non-operating state. The volume change of the chamber C" results from a deformation of the bottom 1" and/or a displacement between the bottom 1" and the insert 2". More precisely, the annular flange 13" of the bottom 1" has a reduced wall thickness, so that it can be elastically deformed, even very weakly. Thus, when the valve stem S is applied against the cup 18, the pin 15" is moved relative to the sleeve 11 and the insert 2. The moving of the pin 15" induces a sealing displacement between the bushing 23" and the crown 14". It follows a decrease of the volume of the chamber C". As soon as the pressure is released on the pin 15", it returns to its non-operating initial position, which induces an increase of the volume of the chamber C". But due to the fact the filling valve is already reclosed, the fluid product present in the inlet duct 16" is suctioned inside the chamber C", leaving thus the inlet duct 16" and the filling port free of fluid product. Avantageously, the inlet duct 16" defines a volume that is less than the volume change of the chamber C", so as to ensure the emptying of the inlet duct 16". Alternatively, it is preferable that the inlet duct 16" is long and thin to increase its capillarity.

According to a third embodiment illustrated in FIG. 5, the chamber C"' contains a spongy material 4"' that is expressed under the action of the fluid product injected under pressure into the chamber C"' and that is impregnated with fluid product as soon as the pressure subsides in the chamber C"'. The spongy material 4"' can for example fill the chamber C"', except for a central passage that directly connects the filling port 10 to the filling valve. For each injection of fluid product under pressure into the chamber C"', the spongy material 4"' is crushed and drains its fluid product content and as soon as the pressure returns to a normal pressure, the spongy material 4"' relaxes and is impregnated with the fluid product left in the chamber C"'. It can be said that the fluid product is suctioned and held in the chamber C"' by capillarity inside the spongy mass 4"'. The inlet duct 16"' is therefore free of fluid product.

In all the described embodiments, the chamber forms or contains means for retaining the fluid product inside the chamber which can even empty the inlet duct, so that there is no risk of leakage.

The invention claimed is:

1. A refillable fluid product dispenser comprising:

a fluid product reservoir defining a neck and a filling port at a bottom portion of the fluid product reservoir, a dispensing member mounted on the neck of the fluid product reservoir for extracting the fluid product, a fluid product filling valve at the bottom portion of the fluid product reservoir above the filling port, the fluid product filling valve comprising a fixed insert and a moveable member that is axial movable relative to the fixed insert between a closed position in which the moveable member is seated on the fixed insert providing a fluid tight seal and an open position in which the moveable member is unseated from the fixed insert providing a passage for fluid through the fluid product filling valve, a fluid product chamber between the filling port and the filling valve, the fluid product chamber comprising an anti-drip retention device for retaining the fluid product inside the fluid product chamber downstream of the filling port, the anti-drip retention device configured to prevent fluid product from leaking out of the fluid product chamber from the filling port and comprising one of:

an anti-drip valve that is normally closed and that opens during filling, a flexible bottom wall that deforms inwardly to reduce a volume of the fluid product chamber during filling and deforms outwardly to increase the volume of the fluid product chamber after filling, or a spongy material that retains fluid product.

2. The dispenser according to claim 1, wherein the fluid product filling valve is a hydraulic valve that opens under the action of the fluid product injected under pressure through the filling port and the chamber.

3. The dispenser according to claim 1, wherein the anti-drip valve comprises a slotted flexible membrane that opens under the action of the fluid product injected under pressure through the filling port and that remains closed and sealed in the non-operating state.

4. The dispenser according to claim 3, wherein the slotted flexible membrane rests in the non-operating state against the inlet.

5. The dispenser according to claim 1, wherein the anti-drip retention device is held in place trapped between a bottom of the fluid product reservoir and the fixed insert.

6. The dispenser according to claim 1, wherein the anti-drip retention device comprises the flexible bottom wall, and wherein the flexible bottom wall defines a variable volume between a maximum volume in the non-operating state and a minimum volume when a pressure is applied at the filling port, creating a suction effect of the fluid product towards an inside of the fluid product chamber, when this anti-drip device returns to the non-operating state.

7. The dispenser according to claim 1, wherein the filling port is an inlet duct that defines a volume that is less than a volume change of the fluid product chamber, so as to ensure the emptying of the inlet duct.

8. The dispenser according to claim 1, wherein the anti-drip retention device comprises the spongy material, and wherein the spongy material is expressed under the action of the fluid product injected under pressure into the chamber and that is impregnated with fluid product as soon as the pressure subsides in the chamber.

9. The dispenser according to claim 1, further comprising a vent valve.

10. The dispenser according to claim 1, wherein the dispensing member is a pump.

11. The dispenser according to claim 1, comprising the fluid product which is a liquid.

12. The dispenser according to claim 1, wherein the anti-drip device comprises the anti-drip valve and wherein the anti-drip valve comprises a slotted flexible membrane that opens under the action of the fluid product injected under pressure through the filling port and that remains closed and sealed in the non-operating state.

* * * * *